United States Patent [19]

Harasaki et al.

[11] Patent Number: 4,797,740
[45] Date of Patent: Jan. 10, 1989

[54] REAL-TIME VIDEO SIGNAL PROCESSING DEVICE CAPABLE OF TYPICALLY EXECUTING INTERFRAME CODING

[75] Inventors: Hidenobu Harasaki; Ichiro Tamitani; Yukio Endo, all of Tokyo, Japan

[73] Assignee: NEC Corporation, Japan

[21] Appl. No.: 59,844

[22] Filed: Jun. 9, 1987

[30] Foreign Application Priority Data

Jun. 10, 1986 [JP] Japan ............................... 61-135316
Aug. 14, 1986 [JP] Japan ............................... 61-189525
Apr. 30, 1987 [JP] Japan ............................... 62-108261

[51] Int. Cl.$^4$ ............................................... H04N 7/12
[52] U.S. Cl. .................................... 358/136; 358/133; 358/135
[58] Field of Search .................. 375/27, 122; 358/136, 358/135, 133, 141, 160

[56] References Cited

U.S. PATENT DOCUMENTS

4,598,411 7/1986 Berkovich et al. ............. 358/136 X

Primary Examiner—Howard W. Britton
Assistant Examiner—Victor R. Kostak
Attorney, Agent, or Firm—Laff, Whitesel, Conte & Saret

[57] ABSTRACT

In a real-time video signal processor for processing an input digital video signal divisible into a succession of principal blocks each of which has at least one scanning line and a time duration shorter than a frame period, each principal block is divided into at least two partial blocks with each scanning line divided into the respective partial blocks. A plurality of signal processing modules are assigned with the respective partial blocks of each principal block, respectively. Responsive to the input digital video signal and an additional digital video signal, the signal processing modules process the respective partial blocks of each principal block into processed signals during the time duration, respectively. Each processed signal comprises a first partial signal used as an output signal of the processor and a second partial signal. A delaying circuit delays the second partial signals derived from the signal processing modules into a delayed signal having a delay equal to a difference between the frame period and the time duration. The delayed signal is used as the additional signal. A plurality of the real-time video signal processors may be connected in cascade to each other. Two memory units may be used instead of the delaying circuit. Readout operation of each principal block from the memory units is controlled by control signals produced by a control signal producing circuit. Principal blocks read out of the memory units are supplied to the signal processing modules.

5 Claims, 7 Drawing Sheets

REAL-TIME VIDEO SIGNAL PROCESSING DEVICE CAPABLE OF TYPICALLY EXECUTING INTERFRAME CODING

BACKGROUND OF THE INVENTION

This invention relates to a real-time video signal processing device comprising a real-time video signal processor for use in carrying out real-time digital video signal processing of a dynamic digital video signal. The real-time digital signal processing is typically interframe coding known in the art. THe dynamic digital video signal may represent a television signal. The video signal processor can be used as a digital filter.

A conventional video signal processor of the type described is disclosed by T. Nishitani et al, including two of the present applicants, in Proceedings of IEEE-IECEJ-ASJ International Conference of Acoustics, Speech, and Signal Proceedings, CH2243-4 (1986), pages 797–800, under the title of "Video Signal Processor Configuration by Multiprocessor Approach."

The conventional video signal processor is for processing an input digital video signal representative of successive pictures into an output digital video signal. Each of the successive pictures is divisible into a predetermined number of blocks. The conventional video signal processor comprises a plurality of signal processing modules corresponding to the respective blocks of each picture. The signal processing modules are for processing the respective blocks of each picture into processed signals during each picture period, respectively. The picture period is 1/30 second long when the input digital video signal comprises thirty pictures per second.

Each signal processing module comprises an input memory for memorizing all data of a corresponding one of the blocks and an output memory for memorizing all data of the processed signal which is produced by the signal processing module under consideration.

Inasmuch as the conventional video signal processor can process one block of each picture during 1/30 seconds, it is possible to realize real-time processing and digital signal processing under control of software.

The conventional video signal processor is, however, defective in that it is necessary to use a memory having a large memory capacity as each of the input and the output memories when the number of the blocks for each picture is small and consequently when each block has a great amount of informations.

In order to reduce the memory capacity of each of the input and the output memories without increasing the number of the blocks for each picture, an improved video signal processor is disclosed by two of the present applicants and Takao Nishitani in Japanese in "Densi Tuusin Gakkai Sogoo Zenkoku Taikai Kooen Ronbunshuu Bunsatsu 5" (The Transactions of the National Conference of the Institute of Electronics and Communication Engineers of Japan, Division 5), published on March, 1986, page 5-150 under the title of "An Introduction of an N-line Processing to the Real-time Video Signal Processor (VSP)". For the improved video signal processor, each picture is divided into a predetermined number of principal blocks. Each principal block consists of a predetermined number n of scanning lines of the input digital video signal, where n represents a predetermined positive integer. Each principal block is divided into a preselected number m of partial blocks so that the partial blocks overlap one another at their peripheral parts, where m represents a preselected positive integer which is greater than one.

The improved video signal processor comprises a plurality of signal processing modules corresponding to the partial blocks of each principal block. Responsive to the input digital video signal, the signal processing modules are used to process the respective partial blocks of each principal block into processed signals during a time duration difined by each of the principal blocks, respectively. Thus, the improved video signal processor produces a sequence of the processed signal as an output digital video signal.

It will now be assumed that the number of the signal processing modules of the improved video signal processor is equal to that of the signal processing modules of the above-mentioned conventional video signal processor. In the improved video signal processor, the signal processing modules process the respective partial blocks each of which is smaller than each block processed by the respective signal processing modules in the conventional video signal processor. As a result, each signal processing module of the improved video signal processor may comprise input and output memories, each having a memory capacity which is smaller than that of each signal processing module of the above-mentioned conventional video signal processor.

The improved video signal processor can execute spatial filtering operation fo spatially filtering the input digital video signal to produce a spatially filtered signal as the output digital video signal. However, the improved video signal processor cannot execute interframe coding.

Description will now be made why the interframe coding cannot be executed. On executing the interframe coding, a prediction signal must be produced on frame period prior to a current input digital video signal which is subjected to the interframe coding. However, the improved video signal processor processes the input digital video signal during the time duration which is defined by each principal block and which is therefore shorter than the picture period. Thus, the prediction signal can not be obtained by the improved video signal processor without modification of the architecture of the processor. This is the reason why the improved video signal processor cannot execute the interframe coding.

Moreover, the improved video signal processor can not execute temporal filtering operation for temporally filtering the input digital video signal to produce a temporally filtered signal as the output digital video signal. This is because a feedback signal must be produced one frame period prior to a current input digital video signal subjected to the temporal filtering on executing the temporal filtering.

SUMMARY OF THE INVENTION

It is therefore an object of this invention to provide a real-time video signal processing device which is capable of executing interframe coding, temporal filtering, or the like.

Other objects of this invention will become clear as the description proceeds.

According to an aspect of this invention, there is provided a real-time video signal processing device comprising a real-time video signal processor for processing an input digital video signal having a frame period into an output digital video signal with the input digital video signal divided into a succession of principal blocks. Each principal block is in a form of at least one scanning line of the input digital video signal and having a time duration which is shorter than the frame period. Each principal block is divisible into at least two partial blocks with each scanning line divided into the respective partial blocks. The real-time video signal processor comprises: a plurality of signal processing modules corresponding to the respective partial blocks of each principal block, the signal processing modules being responsive to the input digital video signal and an additional digital video signal for processing the respective partial blocks of each principal block into processed signals during the time duration, respectively, each processed signal comprising a first and a second partial signal, the first partial signals produced in response to the input and the additional digital video signals being used as the output digital video signal; and delaying means coupled to the signal processing modules for delaying the second partial signals produced in response to the input and the additional digital video signals into a delayed signal with a delay which is equal to a difference between the frame period and the time duration. The delayed signal is supplied back to the signal processing modules as the additional digital video signal.

According to another aspect of this invention, a real-time video signal processing device is for processing an input digital video signal having a frame period into an output digital video signal with the input digital video signal divided into a succession of principal blocks, each principal block being in a form of at least one scanning line of the input digital video signal and having a time duration which is shorter than the frame period, each principal block being divisible into at least two partial blocks with each scanning line divided into the respective partial blocks. The real-time video signal processing device comprises: (1) control signal producing means for successively producing primary control signals during a first and a second interval and for successively producing secondary control signals during the second interval, the primary control signals corresponding to the respective principal blocks, the secondary control signals corresponding to the respective principal blocks; (2) first memory means connected to the control signal producing means for memorizing the input digital video signal and for successively producing the respective principal blocks in response to the primary control signals; (3) a plurality of signal processing modules corresponding to the respective partial blocks of each principal blocks, the signal processing modules being connected to the first memory means for processing during the first interval the respective partial blocks of each principal block produced by the first memory means into primary processed signals of a group, respectively, the primary processed signals corresponding to the respective partial blocks, the signal processing modules specifying an end of the first interval when all principal blocks are successively processed into groups of the primary processed signals; and (4) second memory means connected to the control signal producing means and the signal processing modules for memorizing the primary processed signals for the groups and for successively producing the respective groups of the primary processed signals in response to the secondary control signals. The signal processing modules is furthermore connected to the second memory means to process during the second interval the respective partial blocks of each principal block produced by the first memory means and the corresponding primary processed signals produced by the second memory means into secondary processed signals, respectively, the second processed signals produced in response to all principal blocks being used as the output digital video signal.

DESCRIPTION OF THE PREFERRED EMBODIMENTS

Figure 1:
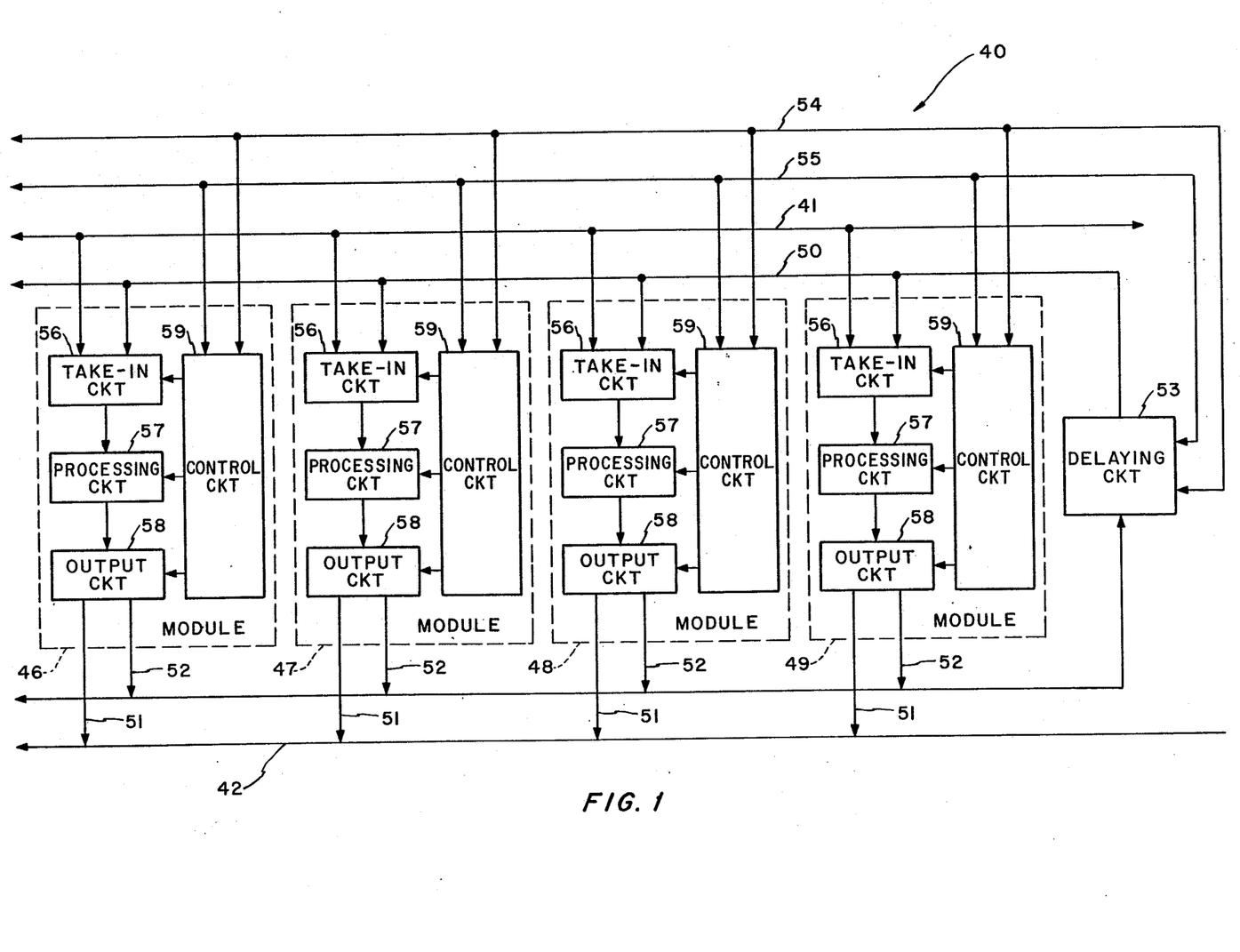
FIG. 1 is a block diagram of a real-time video signal processing device according to a first embodiment of this invention.

Referring to FIG. 1, a real-time video signal processor 40 is for use in a real-time video signal processing device according to a first embodiment of this invention and is for processing an input digital video signal 41 having a frame period into an output digital video signal 42 with the input digital video signal 41 divided into a succession of principal blocks. Each principal block is in a form of either one scanning line or a first predetermined number of scanning lines of the input digital video signal 41 and has a time duration which is shorter than the frame period.

In general, the input digital video signal, such as an NTSC signal, has a bandwidth of about 4.3 MHz. Supposing that the input digital video signal is a one-dimensional signal suitable for transmission of a dynamic or moving-picture video signal, it is necessary to sample an analog video signal into samples of the input digital video signal at a sampling rate of about 10 MHz. In this case, each sample is processed within a period of about 100 nanoseconds. If each partial block (namely, at least one sample) of the input digital video signal is processed during a time duration of at least one scanning line, such signal processing can be carried out at a processing rate which is approximately equal to another processing rate of voice band data processing. Such a time duration of one scanning line is 63.5 microseconds. Thus, according to this invention, the processing rate can be rendered low.

Each principal block is divided into a second predetermined number of partial blocks with each scanning line divided into line parts which are assigned to the respective partial blocks. The second predetermined number should be two or more.

Figure 2:
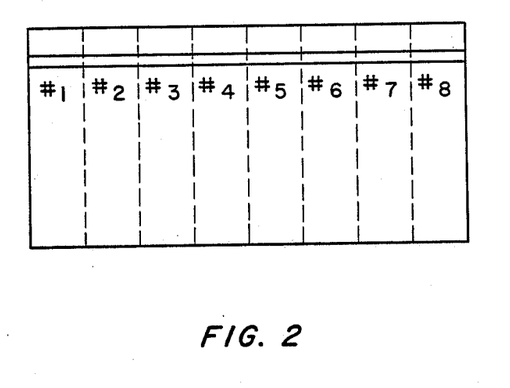
FIG. 2 is a diagram for use in describing operation of this invention.

Turning to FIG. 2 for a short while, each principal block is divided into first through eighth partial blocks #1, #2, ..., and #8. Two of the scanning lines are depicted by parallel lines.

Turning back to FIG. 1, a plurality of signal processing modules 46, 47, 48 and 49 correspond to the respective partial blocks of each principal block. In the example being illustrated, the number of the signal processing modules is four. Responsive to the input digital video signal 41 and an additional video signal 50 which will later be described, the signal processing modules 46, 47, 48, and 49 are used to process the respective partial blocks of each principal block into processed signals during the time duration of each principal block, respectively.

Each processed signal comprises first and second partial signals 51 and 52. When produced in response to all principal blocks of the input digital signal 41 and to the additional digital video signal 50, the first partial signals 51 are used as the output digital video signal 42.

A delaying circuit 53 is coupled to the signal processing modules 46, 47, 48, and 49. The delaying circuit 53 delays the second partial signals 52 produced in response to the input and the additional digital video signals 41 and 50 into a delayed signal with a delay which is equal to a difference between the frame period and the time duration of each principal block. The delayed signal is supplied back to the signal processing modules 46, 47, 48, and 49 as the additional digital video signal 50.

More specifically, the delaying circuit 53 carries out delaying operation with reference to a vertical or picture synchronizing signal 54 and a horizontal or line synchronizing signal 55. The vertial synchronizing signal 54 specifies a start of each picture of the input digital video signal 41 while the horizontal synchronization signal 55 specifies a start of each scanning line of the input digital video signal 41. The delaying circuit 53 is typically a first-in first-out memory.

Inasmuch as the signal processing modules 46, 47, 48, and 49 process the respective partial blocks in response to the input digital video signal 41 into the first and the second partial signals during the time duration, the additional or delayed signal 50 can be produced one frame period prior to a current input digital video signal 41 which is subjected to processing operation by the respective signal processing modules 46, 47, 48, and 49. Thus, the real-time video signal processor 40 can execute interframe coding. That is, the real-time video signal processor 40 is for carrying out interframe encoding on the input digital video signal to produce an encoded signal as the output digital video signal 50. The real-time video signal processor 40 can also execute temporal filtering, or the like in the manner which will presently be described.

Each of the signal processing modules 46, 47, 48, and 49 comprises a take-in circuit 56, a processing circuit 57, an output circuit 58, and a control circuit 59. The control circuit 59 is responsive to the vertical add the horizontal synchronizing signals 54 and 55 for controlling the take-in, the processing, and the output circuits 56, 57, and 58. The take-in circuit 56 comprises first and second input memories (not shown) to which the input and the additional digital video signals 41 and 50 are supplied, respectively. Each of the first and the second input memories is typically a random-access memory. A writing address of each of the first and the second input memories is counted up one by one by a clock sequence produced by the control circuit 59. The output circuit 58 comprises first and second output memories (not shown), each of which is typically a first-in first-out memory. The take-in circuit 56 takes in take-in parts of the input and additional digital video signals 41 and 50 to supply the respective take-in parts to the processing circuit 57 under control of the control circuit 59. The processing circuit 57 is supplied with the partial block. When supplied with the respective take-in parts, the processing circuit 57 processes the respective take-in parts into two output parts. The output circuit 58 memories and produces the respective output parts as processed signal 51 and 52.

Figure 3:
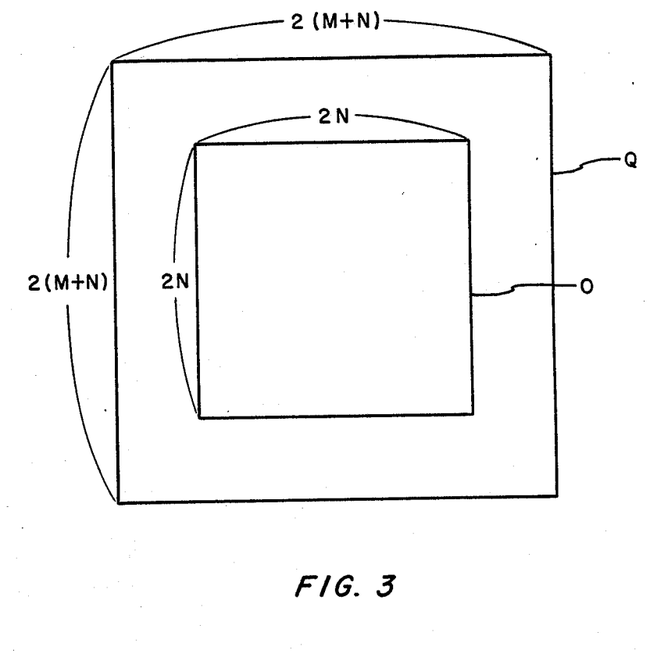
FIG. 3 is a diagram for use in describing operation of a signal processing module which is used in the real-time video signal processing device illustrated in FIG. 1.

Turning to FIG. 3, description will now be made as regards operation of each of the signal processing modules 46, 47, 48, and 49. In FIG. 3, Q represents the take-in part which each signal processing module takes in. On the other hand, 0 represents a processed part into which the take-in part is processed by the processing circuit 57 (FIG. 1). The processed part 0 is equal to the output part of the processed signal. As is apparent from the above, the processed part corresponds to each partial block. The take-in part has a wider square shape having an area of $2(M+N) \times 2(M+N)$ while the processed part 0 has a narrower square shape having another area of $2N \times 2N$. Each signal processing module takes in the input digital video signal which should be processed into the processed part 0.

It will be assumed that the input digital video signal is a two-dimensional signal representative of points x(i,j) of each raster. Description will be made as regards a first case where the two-dimensional signal is supplied to a filter which has an impulse response {h(i,j)} and which is implemented by each of the signal processing modules. Supposing that the processed part 0 is represented by $$O = \{(i,j): -N \leq i \leq N, -N \leq j \leq N\} \quad (1)$$

and that the impulses response, h(i,j) is restricted by a section P represented by $$P = \{(i,j): -M \leq i \leq M, -M \leq j \leq M\}, \quad (2)$$

an output signal y(i,j) of the signal processing module is represented by $$y(i,j) = \sum_{p,q} h(p,q) \cdot x(i-p, j-q), \quad (3)$$

where x(i,j) represents an input signal of the signal processing module. From Equations (1), (2), and (3), it will be clear that the output part is derived from the take-in part Q given by $$Q=\{(i,j): -(M+N)\leq i \leq (M+N), \\ -(M+N)\geq j \geq (M+N)\}. \quad (4)$$

Equation (3) represents a convolution operation as called in the art. Other operation of correlation is approximately expressed by Equation (3). In this case, a relation between the take-in part and the processed part is also expressed as illustrated in FIG. 3.

Description will proceed to a second case where each of the signal processing modules is used to obtain an interframe difference which is used in interframe coding, motion detection, and the like. The interframe difference is represented by $$y(i,j,n)=x(i,j,n)-x(i,j,n-1), \quad (5)$$

where $x(i,j,n)$ represents an input signal of each signal processing module in a frame period n. Equation (5) can be realized by delaying the output signals of the respective signal processing modules with a delay which is equal to a difference between the frame period and the time duration of each principal block.

Turning back to FIG. 1 once again, operation of each signal processing module will be described more in detail. Attention will be directed to the signal processing module 46. With reference to the vertical and the horizontal synchronizing signals 54 and 55, the control circuit 59 of the signal processing module 46 detects a block timing of the partial block assigned to the signal processing module 46 to produce a take-in signal in the manner which will shortly be described in detail. Responsive to the take-in signal, the take-in circuit 56 takes in the partial block of the input digital video signal 41 and a corresponding partial block of the additional digital video signal 50.

Subsequently, the control circuit 59 produces an execution signal when take-in operation comes to an end for the partial blocks. Responsive to the execution signal, the processing circuit 57 executes a predetermined digital processing operation for the partial blocks derived from the take-in circuit 56 to derive results of the digital processing operation. The results are written in the output circuit 58. The predetermined digital processing operation is, for example, the convolution operation represented by Equation (3), an interframe difference represented by Equation (5), or the like. Details of the processing circuit 57 will later be described.

Subsequently, the control circuit 59 detects an output timing of the operation results with reference to the vertical and the horizontal synchronizing signals 54 and 55 to produce an output instruction signal. Responsive to the output instruction signal, the output circuit 58 supplies to the results of the digital processing operation as the first and second processed signals 51 and 52 to an external device (not shown) and to the delaying circuit 53, respectively.

Figure 4:
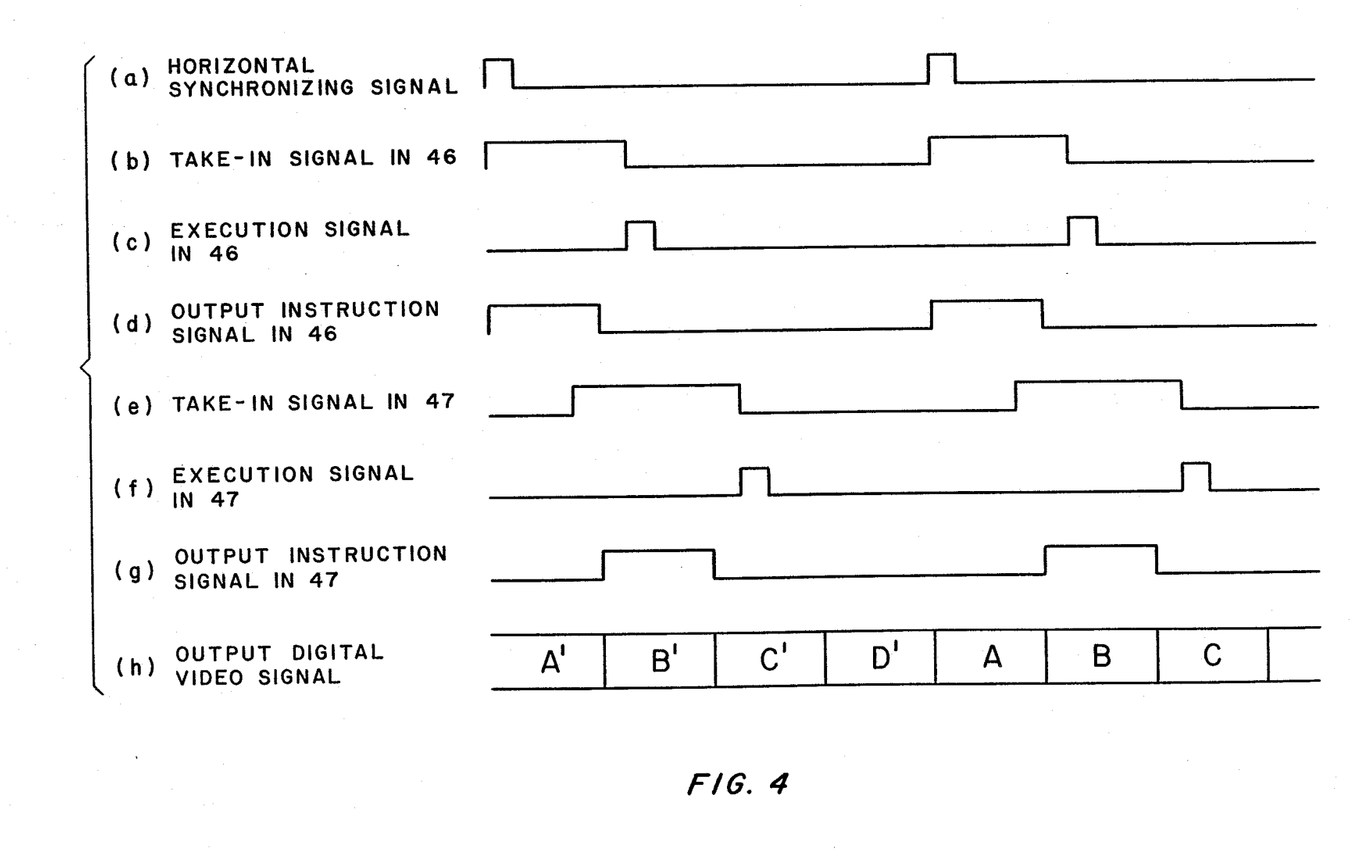
FIG. 4 is a time chart for use in describing operation of two signal processing modules in the real-time video signal processing device illustrated in FIG. 1.

Referring to FIG. 4, attention will be directed to two signal processing modules 46 and 47. Description will now be made as regards the take-in signals, the execution signals, and the output instruction signals used in the signal processing modules 46 and 47. It will be assumed here that each principal block is in a form of one scanning line and that the number of the partial blocks is four for each scanning line. Therefore, four signal processing modules are used to process the partial blocks of each scanning line into the output digital video signal depicted in the bottom line of FIG. 4. The vertical synchronizing signal is not illustrated in FIG. 4. This is because the vertical synchronizing signal need not be used when each principal block is composed of one scanning line. When each principal block is composed of a plurality of scanning lines, the vertical synchronization signal is used for the signal processing.

A horizontal synchronizing signal is depicted along a top line in FIG. 4. The horizontal synchronizing signal specifies a start of each line as described before.

In the signal processing module 46, a take-in signal is produced in the manner exemplified along a second line from the top in synchronism with the horizontal synchronizing signal. Production of the take-in signal is maintained by the control circuit 59 of the module 46 until the take-in part assigned to the module 46 is completely taken in the take-in circuit 56 from the input digital video signal. When take-in operation of the take-in part is finished, the control circuit 59 supplies the processing circuit 57 with an execution signal depicted along a third line from the top. The processing circuit 57 of the module 46 is allowed to carr out the digital signal processing operation during a time duration between a leading edge of the execution signal in question and a leading edge of a succeeding take-in signal depicted along the second line of FIG. 4. The succeeding take-in signal next succeeds the take-in signal under consideration. The control circuit 59 supplies an output instruction signal to the output circuit 58 in synchronism with the leading edge of the succeeding take-in signal. As mentioned before, a time duration of the output instruction signal corresponds to one partial block. The time duration of the output instruction signal is shorter than that of the take-in signal because the output part is equal to the processed part and is narrower than the take-in part as described above. The output part, namely, the processed signal, is composed of a part of the output digital video signal indicated by "A" along the bottom line of FIG. 4.

The signal processing module 47 processes a succeeding partial block next succeeding the partial block which is processed by the signal processing module 46. Operation of the processing module 47 is carried out in accordance with a take-in signal, an execution signal, and a output instruction signal depicted along fifth, sixth, and seventh line from the top, respectively, in the manner similar to that of the signal processing module 46. The signal processing module 47 produces processed signal indicated by "B" along the bottom line as the output digital video signal.

Similarly, signal processing processors 48 and 49 produce processed signals indicated by "C" and "D" along the bottom line, respectively.

On executing operation to obtain an interframe difference in accordance with Equation (5), each signal processing module responds to the input and the additional digital video signals 41 and 50 to carry out calculation of the interframe difference in cooperation with the delaying circuit 53. In this event, the processing circuit 57 of each signal processing module calculated the interframe difference between the input and the additional digital video signals 41 and 50. Simultaneously, the processing circuit 57 supplies the output circuit 58 with the input digital video signal as it is. The output circuit 58 delivers a calculated interframe difference and the input digital video signal 41 to an external arrangement (not shown) and the delaying circuit 53 as the first partial signal (namely, the output digital video signal) 51 and the second partial signal 52, respectively. The delaying circuit 53 delays the second partial signal 52 to produce a delayed signal as the additional signal 50 in the manner described above. The additional signal is produced one frame period prior to a current input digital video signal 41 which is subjected to the signal processing.

Figure 5:
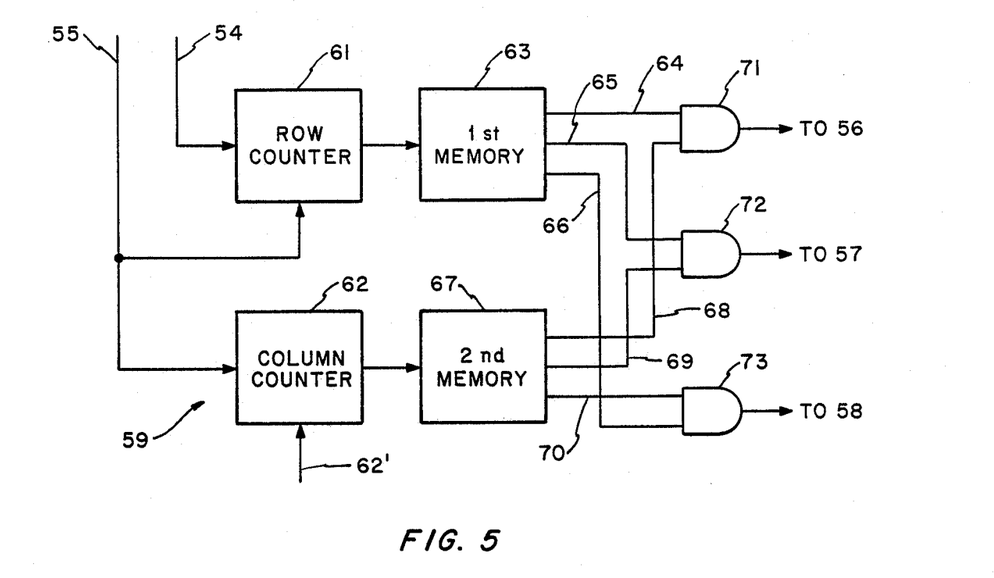
FIG. 5 is a block diagram of a control circuit which is used in a signal processing module of the real-time signal processing device illustrated in FIG. 1.

Referring to FIG. 5, the control circuit 59 of each signal processing module comprises a line number or row counter 61 and a sample number or column counter 62. The row counter 61 is reset to a reset state in response to the vertical synchronizing signal 54. Simultaneously, the row counter 61 is counted up one by one whenever the row counter 61 receives the horizontal synchronization signals 55. As a result, the row counter 61 produces a line number signal representative of a row or line number of a current scanning line in a curren picture of the input digital video signal 41 (FIG. 1).

On the other hand, the column counter 62 is reset to a reset state in response to each horizontal synchronizing signal. Simultaneously, the column counter 62 is counted up one by one whenever the column counter 62 receives clock signals 62' which corresponds to samples of the input digital video signal 41. As a result, the column counter 62 produces a sample number signal respective of a sample number of a current sample in a current scanning line of the input digital video signal 41 (FIG. 1).

A first memory 63 has a row take-in part table which preliminary memorizes a logic "1" level in each of addresses corresponding to a row numbers belonging to the take-in part assigned to the signal processing module in question. The first memory 63 receives the row number signal as an address signal. As a result, the first memory 63 produces a first row coincidence signal 64 of a logic "1" level out of the row take-in part table when the row number represented by the row number signal is coincident with any one of the row numbers belonging to the take-in part.

The first memory 63 furthermore has a row execution table which preliminarily memorizes a logic "1" level in each of addresses corresponding to row numbers defined by the execution signal for the take-in part assigned to the signal processing module in question. When coincidence occurs between the row number represented by the row number signal received as the address signal and any one of the row numbers defined by the execution signal, the first memory 63 produces a second row coincidence signal 65 of a logic "1" level out of the row execution table.

The first memory 63 has still further a row processing part table which preliminarily memorizes a logic "1" level in each of addresses corresponding to row numbers belonging to the processing part assigned to the signal processing module in question. When coincidence takes place between the row number represented by the row number signal received as the address signal and any one of the row numbers belonging to the processing part, the first memory 63 produces a third row coincidence signal 66 of a logic "1" level out of the row processing part table. It will now be possible to understand that the row take-in, execution, and processing part tables are depicted by output leads 64, 65, and 66.

The first memory 63 is, for example, a real-only memory.

The second memory 67 is similar to the first memory 63 except that the second memory 67 receives the sample number signal instead of the row number signal and produces first, second, and third sample coincidence signals 68, 69, and 70 in accordance with the sample number represented by the sample number signal. The first sample coincidence signal 8 is produced when the sample number represented by the sample number signal coincides with any one of the sample numbers belonging to the take-in part assigned to the signal processing module in question. The second column coincidence signal 69 is produced when the sample number of the sample number signal is coincident with any one of the sample numbers defined by the execution signal for the take-in part assigned to the signal processing module in question. The third sample coincidence signal 70 is produced when the sample number of the sample number signal is coincident with any one of the sample numbers belonging to the processing part assigned to the signal processing module in question.

Responsive to the first row and the first sample coincidence signals 64 and 68, a first AND circuit 71 produces the take-in signal. A second AND circuit 72 produces the execution signal in response to the second row and the second sample coincidence signals 65 and 69. The output instruction signal is produced by a third AND circuit 73 in response to the third row and the third sample coincidence signals 66 and 70.

Figure 6:
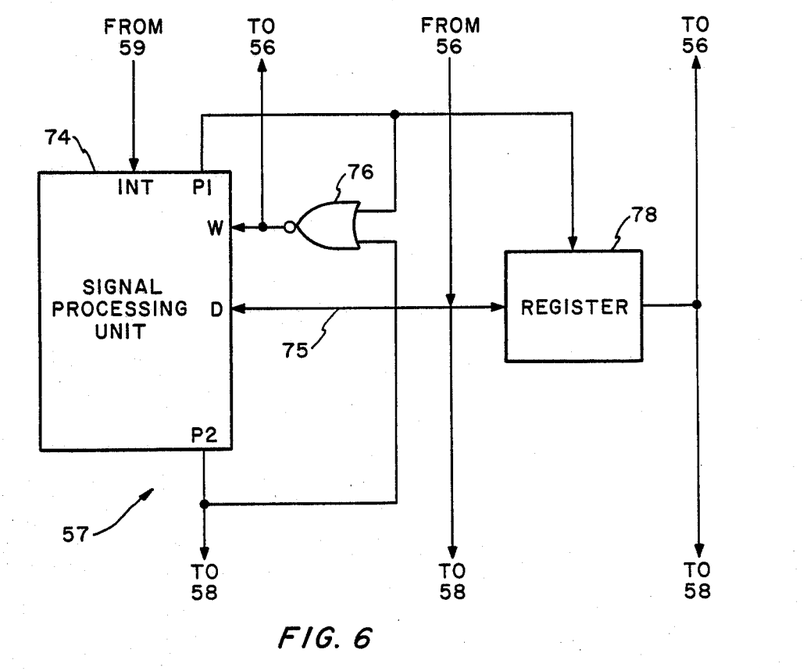
FIG. 6 is a block diagram of a processing circuit which is used in a signal processing module of the real-time video signal processing device illustrated in FIG. 1.

Referring to FIG. 6, the processing circuit 57 of each signal processing module comprises a signal processing unit 74 which is, for example, a signal processing unit μPD7720 manufactured and sold by NEC Corporation, Tokyo, Japan. The signal processing unit 74 has an interrupt terminal INT and carries out interrupt processing when an interrupt signal is supplied to the interrupt terminal INT. The signal processing unit 74 further has first and second bit output ports P1 and P2, a writing mode terminal W, and a data part D which part D is connected to a bidirectional parallel bus 75. When the writing mode terminal W is supplied with a logic "1" level, the bidirectional parallel bus 75 can be used as an input bus by the signal processing unit 74. Otherwise, the bidirectional parallel bus 75 can be used as an output bus by the signal processing unit 74. The second bit output port P2 is for delivering a write enable signal of a logic "1" level to the output circuit 58. By the write enable signal, the output circuit 58 is enabled to writing of address data and other data.

Whe the execution signal is received at the interrupt terminal INT from the control portion 59, the signal processing unit 74 starts digital signal processing as the interrupt processing. In the digital signal processing, it is necessary for the signal processing unit 74 to derive processing data from the take-in circuit 56. Therefore, the signal processing unit 74 prepares particular address data of the take-in circuit 56 on the data port D and then gives the first bit output port P1 a logic "1" level.

It is to be noted here that the second bit output port P2 given a logic "0" in this state. That is, the write enable signal is not supplied to the output circuit 58. When the first bit output port P1 has a logic "1" level, a NOR circuit 76 produces a logic "0" level. As a result, the writing mode terminal W is given by the logic "0" level. Simultaneously, the take-in circuit 56 is not permitted to supply data to the processing circuit 57 by the logic "0" level of an output terminal of the NOR circuit 76. By the logic "0" level of the output terminal of the NOR circuit 76, the signal processing unit 74 is permitted to use the bidirectional bus 75 as the output bus. The particular address data are delivered from the data port D to a register 78 through the bidirectional bus 75. The register 78 stores data when a logic "1" level is applied to the register 78. When a logic "0" level is applied to the register 78, the register 78 delivers a stored data to the take-in and the output circuits 56 and 58. Therefore, the particular address data are stored into a register 78. Subsequently, the signal processing unit 74 gives the first bit output port P1 a logic "0" level to make the register 78 deliver the particular address data to the take-in circuit 56 and to make the NOR circuit 76 produce a logic "1" level. Inasmuch as the output terminal of the NOR circuit 76 produces a logic "1" level, the take-in circuit 56 is permitted to supply the processing circuit 57 with a processing data which corresponds to the particular address data. The processing data is delivered to the data port D through the bidirectional bus 75.

In order to deliver the output circuit 58 (FIG. 1) with processed data subjected to the signal processing by the signal processing unit 74, it is necessary to deliver specific address data to the output circuit 58. For this purpose, the signal processing unit 74 prepares the specific address data on the data port D at first. Subsequently, the signal processing unit 74 gives the first bit output port P1 a logic "0" level to make the register 78 store the specific address data. The specific address data is delivered to the output circuit 58. Subsequently, the signal processing unit 74 prepares the processed data on the data port D. After that, the signal processing unit 74 gives the second bit output port P2 a logic "1" level. As a result, the NOR circuit 76 produces a logic "0" level. This not only allows the signal processing unit 74 to use the bidirectional bus 75 as the output bus but also prohibits th take-in circuit 56 from delivering data to the processing circuit 57. As a result, the processed data on the data port D is delivered from the signal processing unit 74 to the output circuit 58 through the bidirectional bus 75. Inasmuch as the output circuit 58 receives the write enable signal of a logic "1" from the second bit output port P2, the processed data are written in the output circuit 58 at addresses specified by the specific address data.

Figure 7:
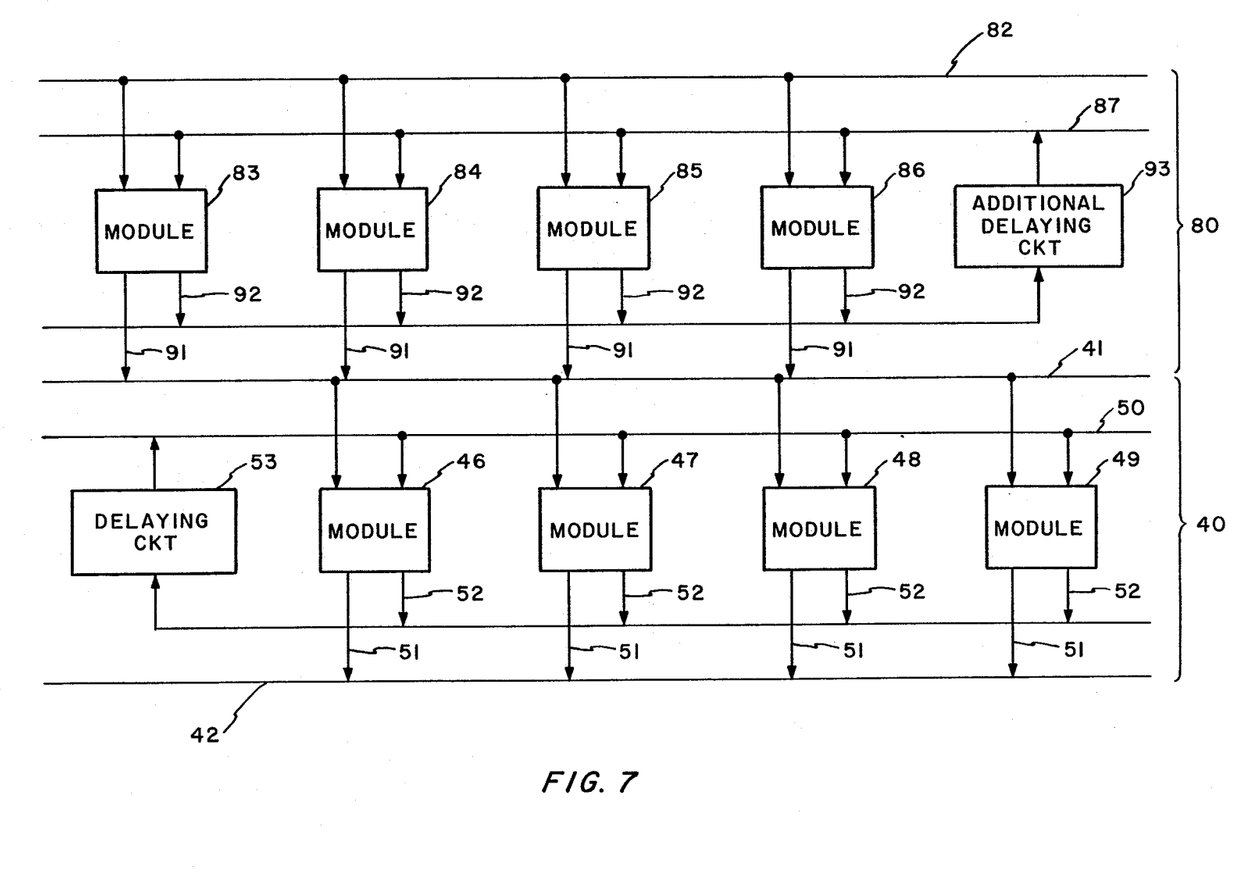
FIG. 7 is a block diagram of a real-time video signal processing device according to a second embodiment of this invention.

Referring to FIG. 7, a real-time video signal processing device according to a second embodiment of this inventio is similar to the illustrated with reference to FIG. 1 except that a preliminary real-time video signal processor 80 is connected in cascade to the real-time video signal processor 40. Merely for convenience of description, the real-time video signal processors 80 and 40 will be referred to as first and second real-time video signal processors, respectively. The second real-time video signal processor 40 comprises similar parts designated by like reference numerals and is operable in the manner described hereinabove.

Figure 8:
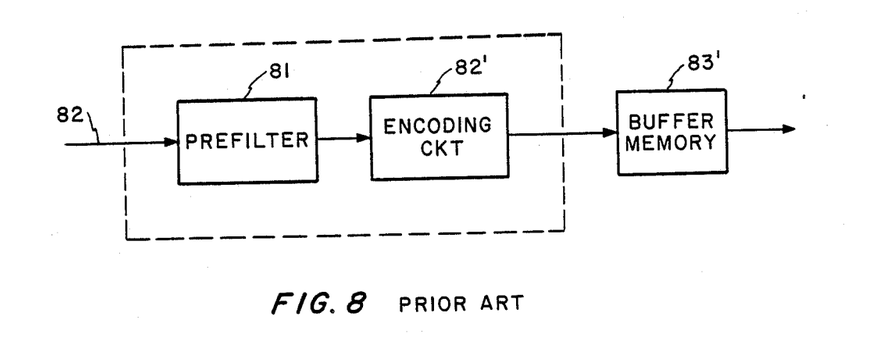
FIG. 8 is a block diagram of a conventional interframe encoding device.

Temporarily referring to FIG. 8, an interframe encoding device comprises a prefilter 81 in general. Responsive to an original digital video signal 82, the prefilter 81 spatially and temporally filter the original digital video signal 82 into a filtered signal. The temporal filtering is more effective to elevate correlation between pictures or frames.

An interframe encoding circuit 82' carries out interframe encoding on the filtered signal to produce an encoded signal. The encoded signal is sent through a buffer memory 83' to a transmission path at a constant transmission rate.

Turning back to FIG. 7, the first and the second real-time video signal processor 80 and 40 correspond to the prefilter 81 (FIG. 8) and encoding circuit 82' (FIG. 8), respectively. The first real-time video signal processor 80 is for processing the original digital video signal 82 having the frame period into the input digital video signal 41 with the original digital video signal divided into a succession of primary blocks. Like the principal block described heretobefore, each primary block is in a form of at least one scanning line of the original digital video signal and has the time duration. Each primary block is divisible into at least two secondary blocks with each scanning line divided into the respective secondary blocks. The secondary blocks are similar to the partial blocks.

A plurality of block processing modules 83, 84, 85, and 86 correspond to the respective secondary blocks. The number of the block processing modules is four and is equal to that of the signal processing modules 46, 47, 48, and 49. Responsive to the original digital video signal 82 and a supplementary digital video signal 87, which corresponds to the additional digital video signal 50, the block processing modules 83, 84, 85, and 86 are used to process the respective secondary blocks of each primary block into additional processed signals during the time duration, respectively. Each additional processed signal comprises first and second component signals 91 and 92. The first component signal is produced in response to the original and the supplementary digital video signals 82 and 87 and is used as the input digital video signal 41 of the second real-time video signal processor 40.

Additional delaying circuit 93 is coupled to the block processing modules 83, 84, 85, and 86 for delaying the second component signals 92 produced in response to the original and the supplementary digital video signals into an additional delayed signal with the delay mentioned before The additional delayed signal is supplied back to the block processing modules 84, 85, 86, and 87 as the supplementary digital video signal 87.

The first real-time video signal processor 80 is for spatially and temporally filtering the original digital video signal 82 into a filtered signal to produce the filter signal as the input digital video signal 41 of the second real-time video signal processor 40. The first real-time video signal processor 80 is operable as the prefilter 81 illustrated in FIG. 8.

The second real-time video signal processor 40 is for carrying out interframe encoding on the input digital video signal 41 to produce the encoded signal as the output digital video signal 42. The second real-time video signal processor 40 is operable as the encoding circuit 82'. In this case, the second partial signals 52 are used a locally decoded signal known in the art. The delayed or additional digital video signal 50 serves as a prediction signal known in the art.

Figure 9:
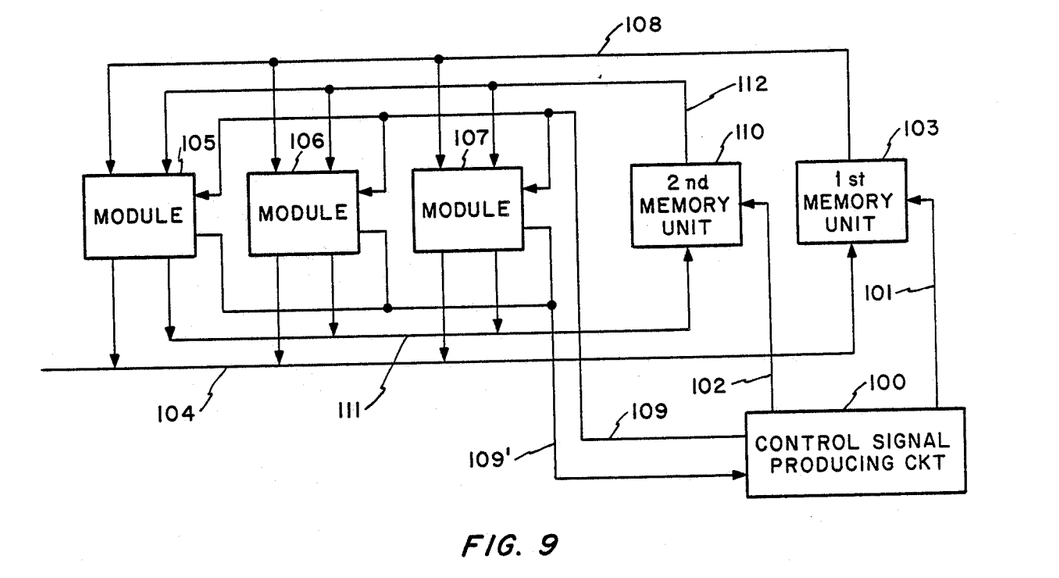
FIG. 9 is a block diagram of a real-time video signal processing device according to a third embodiment of this invention.

Referring to FIG. 9, a real-time video signal processing device according to a third embodiment of this invention is for use in a conference television system known in the art, and the like and is operable as a part of an encoding device which may be somewhat different from that illustrated ih FIG. 8. In this connection, description will be at first directed to the encoding device to which the real-time signal processing device is applicable.

Temporarily referring to FIG. 10, the encoding device is similar to that illustrated with reference to FIG. 8 except that a modified coding circuit 95 is used as the encoding circuit 82' illustrated in FIG. 8. In the modified coding circuit 95, generation of information rate is controlled by estimating the information rate.

More specifically, the coding circuit 95 comprises a first coding circuit 96 which is responsive to the spatially and temporally filtered signal and which calculates a motion compensated interframe prediction error. In addition, the prediction error is subjected to orthogonal transform and is produced as a first coded signal. Responsive to the first coded signal, an estimating circuit 97 estimates an information rate in accordance with the first coded signal to produce a quantization parameter. To this end, the estimating circuit 97 statistically processes the coded signal for each picture into a statistically processed result and decides the quantization parameter in accordance with the statistically processed result. Thus, the estimating circuit 97 necessarily has a predetermined circuit delay to proces the first coded signal into the quantization parameter.

A delay circuit 98 delays the first coded signal into a delayed signal delayed by the circuit delay.

Responsive to the delayed signal, a second coding circuit 99 quantizes the delayed signal in accordance with the quantization parameter into a second coded signal which may be made to correspond to the encoded signal described with reference to FIG. 8.

Figure 10:
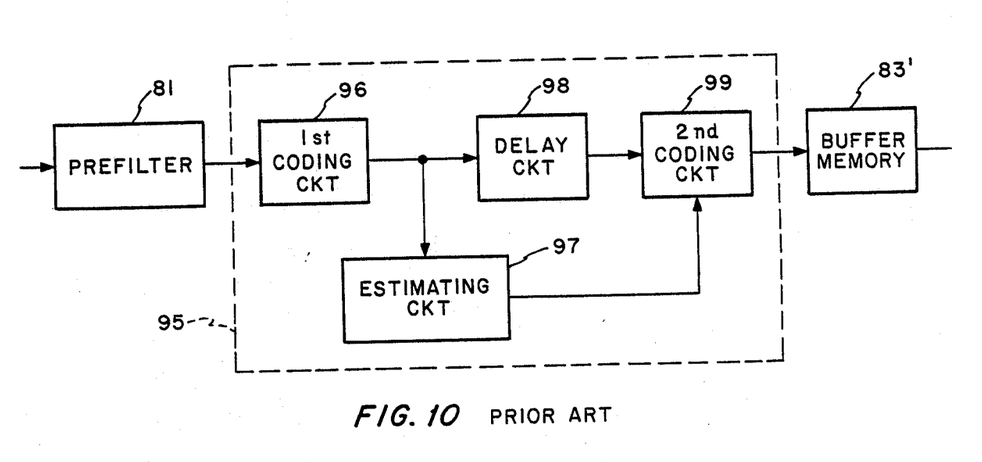
FIG. 10 is a block diagram of another conventional interframe coding device.

Turning back to FIG. 9, the real-time video signal processing device is operable as a combination of the estimating, the delay, and the second coding circuits 97, 98, and 99 (FIG. 10). That is, the real-time video signal processing device is for processing the first coded signal derived from the first coding circuit 96 (FIG. 10) into the second coded or encoded signal which should be from the second coding circuit 99 (FIG. 10). Merely for convenience of description, the first and the second coded signals will be referred to as input and output digital video signals, respectively.

The real-time video signal processing device processes the input digital video signal having a frame period into the output digital video signal. The input digital video signal is divided into a succession of principal blocks like the real-time video signal processing device illustrated in FIG. 1. Each principal block is in a form of either one scanning line or a first predetermined numbers of scanning lines of the input digital video signal and has a time duration which is shorter than the frame period. Each principal block is divisible into a second predetermined number of partial blocks with each scanning line divided into the respective partial blocks. It will be assumed that the second predetermined number is three.

In the real-time video signal processing device, a control signal producing circuit 100 successively supplies primary control signals to a first control line 101 during first and second intervals T1 and T2. Furthermore, the control signal producing circuit 100 successively supplies secondary control signals to a second control line 102 during the second interval T2. The second interval T2 succeeds the first interval T1.

The primary control signals last for the respective principal blocks, respectively. Thus, the primary control signals correspond to the respective principal blocks. The secondary control signals also correspond to the respective principal blocks.

A first memory unit 103 Preliminarily memorizes the input digital video signal through a first bus 104. The first memory unit 103 is connected to the control signal producing circuit 100 through the first control line 101 and successively produces the respective principal blocks in response to the primary control signals. The first memory unit 103 may be, for example, a first-in first-out memory.

A plurality of signal processing modules 105, 106, and 107 correspond to the respective partial blocks of each principal block. The number of the signal processing modules is equal to three when each principal blocks divided into three of the partial blocks. The signal processing modules 105, 106, and 107 are connected to the first memory unit 103 through a second bus 108. The signal processing modules 105, 106, and 107 process during the first interval T1 the respective partial blocks of each principal block produced by the first memory unit 103. As a result, primary processed signals of a group are produced which are made to correspond to the respective partial blocks. The signal processing modules 105, 106, and 107 begin to process the partial blocks in response to take-in order signals 109 which are in synchronism with the primary control signals. Each of the signal processing modules 105, 106, and 107 produces an end signal 109' whenever processing comes to an end for each of the partial blocks in the each of the signal processing modules 105, 106 and 107.

When all principal blocks are successively processed into groups of the primary processed signals, the signal processing modules 105, 106, and 107 specifies an end of the first interval T1.

It should be noted here that, during the first interval T1, the signal processing modules 105, 106, and 107 statistically process the respective partial blocks into statistically processed results, respectively.

A second memory unit 110 is connected to the control signal producing circuit 100 through the second line 102 and to the signal processing modules 105, 106, and 107 through a third bus 111. The second memory unit 110 memorizes the primary processed signals of the groups and successively produces the respective groups of the primary processed signals in response to the secondary control signals. The second memory unit 110 may be, for example, a first-in first-out memory.

The signal processing modules 105, 106, and 107 are furthermore connected to the second memory unit 110 through a fourth bus 112 to process during the second interval T2 the respective partial blocks of each principal block produced by the first memory unit 103 and the corresponding primary processed signals produced by the second memory unit 110 into secondary processed signals, respectively. The secondary processed signals are produced in response to all principal blocks and are memorized in the second memory unit 110 as the output digital video signal.

It should be noted here that, during the second interval T2, the quantizing operation is carried out to produce the second coded signal as the output digital video signal.

Description will now be made as regards operation of the signal processing modules more in detail.

During the first interval T1, the statistically processed results are produced by the signal processing modules 105, 106, and 107 and are successively memorized in the second memory unit 110 through the third bus 103. During the second interval T2, the signal processing modules 105, 106, and 107 take in the respective partial blocks of each principal block of the input digital video signal from the first memory unit 103 through the second bus 108. Simultaneously, the signal processing modules 105, 106, and 107 take in the corresponding statistically processed results from the second memory unit 110 through the fourth bus 112. Such take-in operation is maintained until the signal processing modules 105, 106, and 107 take in all of the statistically processed results for all picture. Subsequently, the signal processing modules 105, 106, and 107 calculates a statistical result for all pictures with reference to the all of the statistically processed results to produce the quantization parameter in accordance with the statistical result for all pictures. The signal processing modules 105, 106, and 107 quantize the respective take-in partial blocks in accordance with the quantization parameter into the second coded signal as the output digital video signal.

Figure 11:
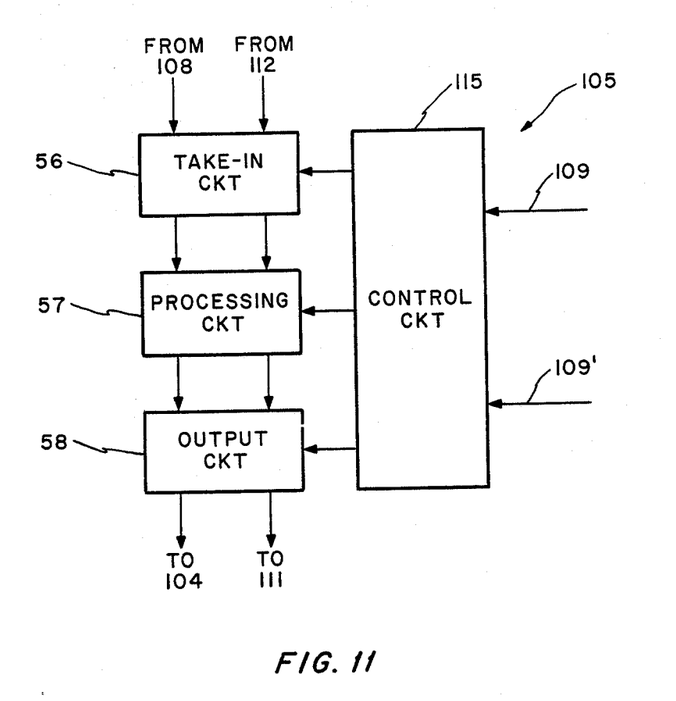
FIG. 11 is a block diagram of a signal processing module which is used in the real-time video signal processing device illustrated in FIG. 9.

Referring to FIG. 11, each of the signal processing module 105, 106, and 107 is similar to that of the real-time video signal processing device illustrated in FIG. 1 except that a control circuit 115 produces the take-in signal in response to the take-in order signal 109 and that the control circuit 105 produces the end signal 109' whenever processing comes to an end for each partial block.

Figure 12:
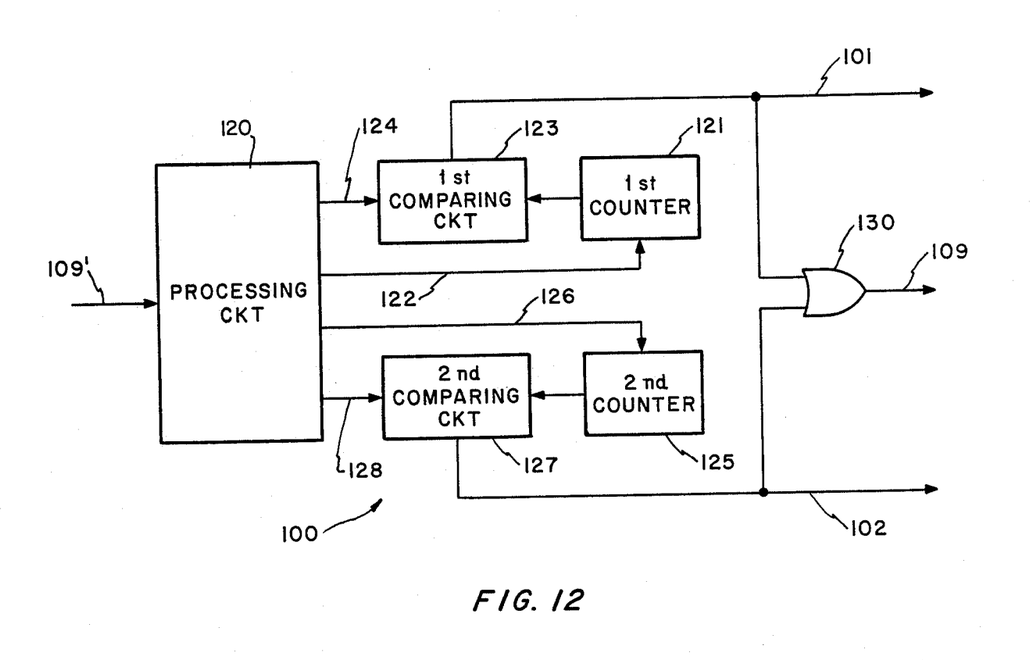
FIG. 12 is a block diagram of a control signal producing circuit which is used in the real-time video signal processing device illustrated in FIG. 9.

Referring to FIG. 12, the control signal producing circuit 100 comprises a processing circuit 120 which controls and establishes the number of scanning lines derived from eac of the first and the second memory units 103 and 110 (FIG. 9) in response to the end signals 109', system clocks (not shown) supplied to the real-time video signal processing device, and vertical and horizontal synchronizing signals.

A first counter 121 is counted up by the system clocks and the vertical synchronization signals when a clear signal 122 of a logic "1" level is derived from the processing circuit 120. That is, the first counter 121 is counted up one by one whenever one scanning line is read out of the first memory unit 103 (FIG. 9). A first comparing circuit 123 compares a counted value of the first counter 121 with an established value 124 of the number of the scanning lines for the first memory unit 103 (FIG. 9) to produce a logic "1" level signal as the primary control signal when the established value 124 is greater than the counted value. Otherwise, a logic "0" level is supplied to the first control line 101.

Like the first counter 121, a second counter 125 carries out counting operation when a clear signal 126 of a logic "1" level is derived from the processing circuit 120. The second counter 125 is counted up one by one whenever one scanning line is read out of the second memory unit 110 (FIG. 9). A second comparing circuit 127 compares a counted value of a second counter 125 with an established value 128 of the number of the scanning lines for the second memory unit 110 (FIG. 9) and produces a logic "1" level signal as the secondary control signal when the established value 128 is greater than the counted value of the second counter 125. Otherwise, a logic "0" level is supplied to the second control line 102

Responsive to the primary and the secondary control signals, an OR circuit 130 produces the take-in order signal 109.

What is claimed is:

1. A real-time video signal processing device comprising a real-time video signal processor for processing an input digital video signal having a frame period into an output digital video signal with said input digital video signal divided into a succession of principal blocks, each principal block being in a form of at least one scanning line of said input digital video signal and having a time duration which is shorter than said frame period, each principal block being divisible into at least two partial blocks with each scanning line divided into the respective partial blocks, said real-time video signal processor comprising:

a plurality of signal processing modules corresponding to the respective partial blocks of each principal block, said signal processing modules being respective to said input digital video signal and an additional digital video signal for processing the respective partial blocks of each principal block into processed signals during said time duration, respectively, each processed signal comprising a first and a second partial signal, the first partial signals produced in response to said input and said additional digital video signals being used as said output digital video signal; and delaying means coupled to said signal processing modules for delaying the second partial signals produced in response to said input and said additional digital video signals into a delayed signal with a delay which is equal to a difference between said frame period and said time duration, said delayed signal being supplied back to said signal processing modules as said additional digital video signal.

2. A real-time video signal processing device as claimed in claim 1, wherein said real-time video signal processor is for carrying out interframe encoding on said input digital video signal to produce an encoded signal as said output digital video signal.

3. A real-time video signal processing device as claimed in claim 1, further comprising a preliminary real-time video signal processor for processing an original digital video signal having said frame period into said input digital video signal with said original digital video signal divided into a succession of primary blocks, each primary block being in a form of at least one scanning line of said original digital video signal and having said time duration, each primary block being divisible into at least two secondary blocks with each scanning line divided into the respective secondary blocks, said preliminary real-time video signal processor comprising:

a plurality of block processing modules corresponding to the respective secondary blocks, said block processing modules being respective to said original digital video signal and a supplementary digital video signal for processing the respective secondary blocks of each primary block into additional processed signals during said time duration, respectively, each additional processed signal comprising a first and a second component signal, the first component signal produced in response to said original and said supplementary digital video signals being used as said input digital video signal;

additional delaying means coupled to said block processing modules for delaying the second component signals produced in response to said original and said supplementary digital video signals into an additional delayed signal with said delay, said additional delayed signal being supplied back to said block processing modules as said supplementary digital video signal.

4. A real-time video signal processing device as claimed in claim 3, wherein said preliminary real-time video signal processor is for filtering said original digital video signal into a filtered signal to produce said filtered signal as said input digital video signal.

5. A real-time video signal processing device for processing an input digital video signal having a frame period into an output digital video signal with said input digital video signal divided into a succession of principal blocks, each principal block being in a form of at least one scanning line of said input digital video signal and having a time duration which is shorter than said frame period, each principal block being divisible into at least two partial blocks with each scanning line divided into the respective partial blocks, said real-time video signal processing device comprising:
- control signal producing means for successively producing primary control signals during a first and a second interval and for successively producing secondary control signals during said second interval, said primary control signals corresponding to the respective principal blocks, said secondary control signals corresponding to the respective principal blocks;
- first memory means connected to said control signal producing means for memorizing said input digital video signal and for successively producing the respective principal blocks in response to said primary control signals;
- a plurality of signal processing modules corresponding to the respective partial blocks of each principal blocks, said signal processing modules being connected to said first memory means for processing during said first interval the respective partial blocks of each principal block produced by said first memory means into primary processed signals of a group, respectively, said primary processed signals corresponding to the respective partial blocks, said signal processing modules specifying an end of said first interval when all principal blocks are successively processed into groups of said primary processed signals; and
- second memory means connected to said control signal producing means and said signal processing modules for memorizing the primary processed signals of said groups and for successively producing the respective groups of said primary processed signals in response to said secondary control signals;
- said signal processing modules being furthermore connected to said second memory means to process during said second interval the respective partial blocks of each principal block produced by said first memory means and the corresponding primary processed signals produced by said second memory means into secondary processed signals, respectively, the second processed signals produced in response to all principal blocks being used as said output digital video signal.

* * * * *